Figure 4:
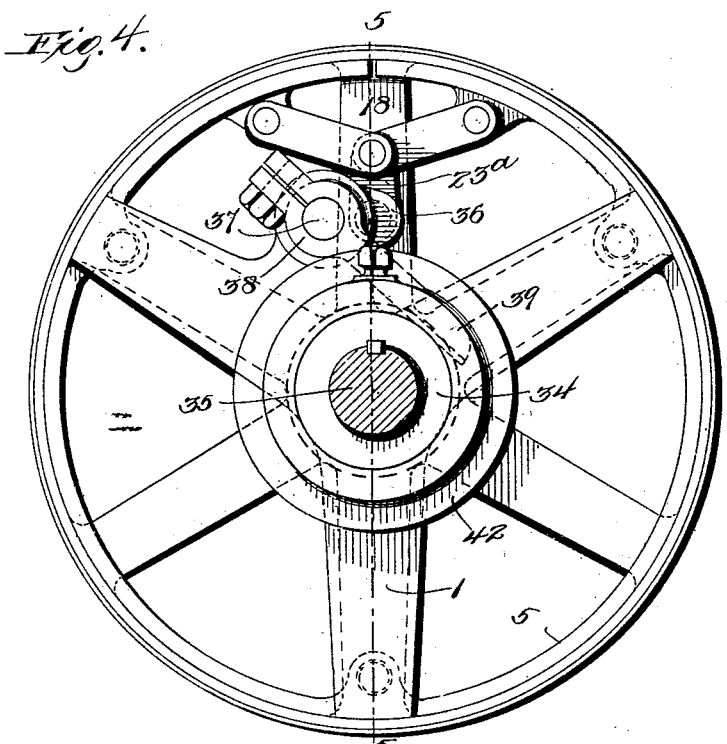

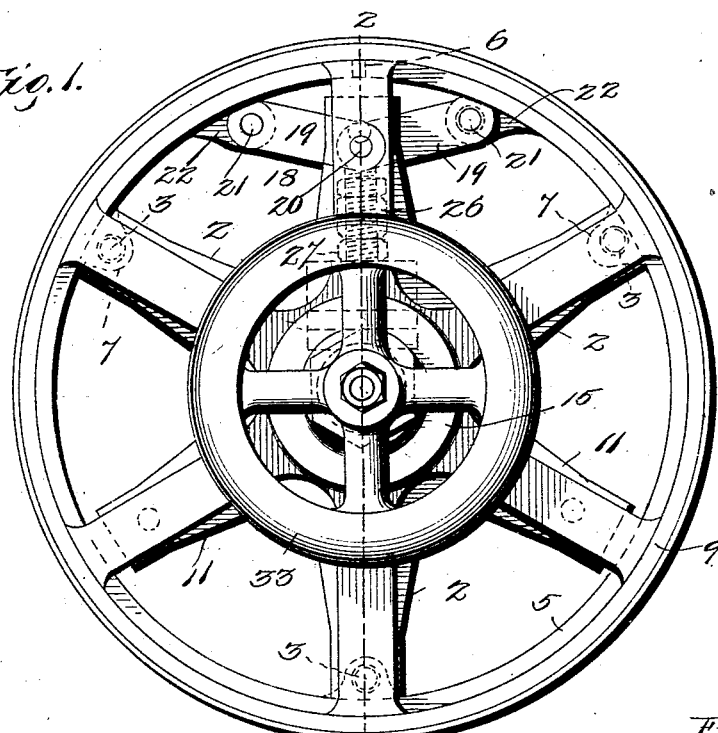

No. 713,556. Patented Nov. 11, 1902.
T. S. CASNER.
FRICTION CLUTCH.
(Application filed Feb. 7, 1902.)
(No Model.) 3 Sheets—Sheet 2.

Witnesses
Inventor
Thaddeus Stephens Casner
by
Attorneys

No. 713,556. Patented Nov. 11, 1902.
T. S. CASNER.
FRICTION CLUTCH.
(Application filed Feb. 7, 1902.)
(No Model.) 3 Sheets—Sheet 3.

Witnesses Inventor
Thaddeus Stephens Casner
by L. Deane
Attorneys

UNITED STATES PATENT OFFICE.

THADDEUS STEPHENS CASNER, OF AUBURN, INDIANA, ASSIGNOR TO THE MODEL GAS ENGINE COMPANY, OF AUBURN, INDIANA, A CORPORATION.

FRICTION-CLUTCH.

SPECIFICATION forming part of Letters Patent No. 713,556, dated November 11, 1902.

Application filed February 7, 1902. Serial No. 92,956. (No model.)

*To all whom it may concern:*

Be it known that I, THADDEUS STEPHENS CASNER, a citizen of the United States, residing at Auburn, in the county of Dekalb and State of Indiana, have invented certain new and useful Improvements in Friction-Clutches, of which the following is a specification.

This invention relates to machine elements, and has special reference to that class of devices commonly known as "friction-clutches" and designed for a variety of purposes in connection with different kinds of machinery.

To this end the invention contemplates a simple, practical, and thoroughly effective form of friction-clutch possessing special utility as a part of a friction-clutch pulley, but also capable of general application not only to pulleys arranged in different positions and to those which may or may not be mounted upon a line-shaft, but also to couplings of that character requiring a friction-clutch, thereby providing means for producing a practical form of friction-clutch coupling for adjacent parts of the same line of shafting.

In carrying out these general objects the invention has in view a friction-clutch embodying means whereby a uniform friction bearing or clutch is provided for throughout the entire perimeter of the pulley or wheel to be clutched, thus obviating the objections to that type of friction-clutch pulleys wherein the friction shoe or clutch element is clutched upon the wheel or pulley all from one side, thus materially affecting the power to be derived from the clutched parts.

A further object of the invention is to provide an improved friction-clutch embodying actuating means which effect a thorough locking of the parts in their clutched condition to prevent accidental slipping or loosening.

Also in its preferred aspect the invention contemplates the employment of a carrier or carrying element which not only constitutes a support for the clutch elements, but also provides a bearing-support for the pulley or wheel associated with the said clutch elements.

With these and many other objects in view, which will more readily appear as the nature of the invention is better understood, the same consists in the novel construction, combination, and arrangement of parts to be hereinafter more fully described, illustrated, and claimed.

The essential features of the clutch or clutching device proper are necessarily susceptible to considerable modification, especially in view of the adaptability of the clutch or clutching device to suit different conditions of pulley-mountings and shafting; but a few of the preferred embodiments of the invention are shown in the accompanying drawings, in which—

Figure 5:
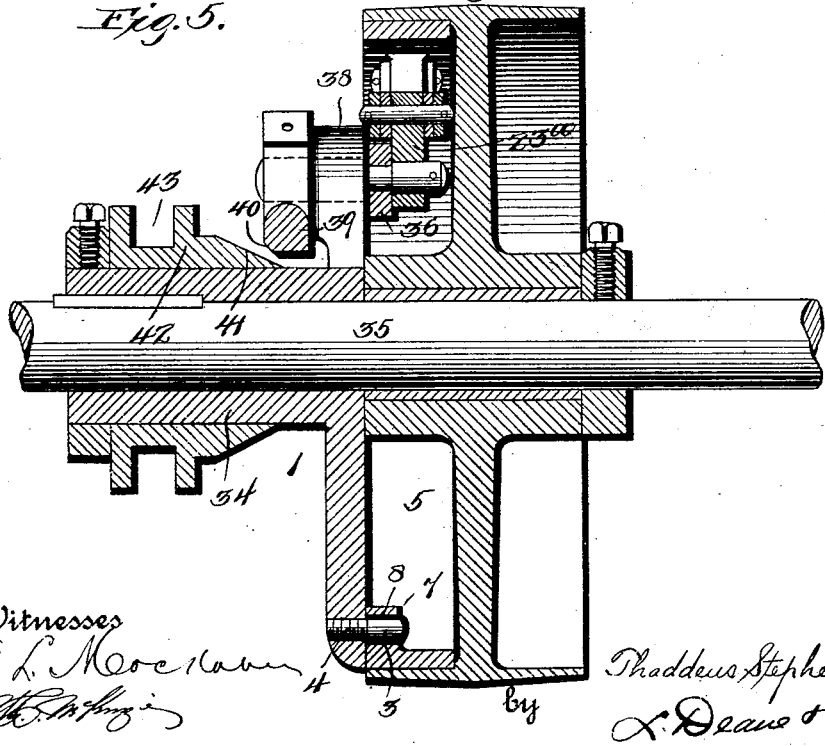
Figure 6:
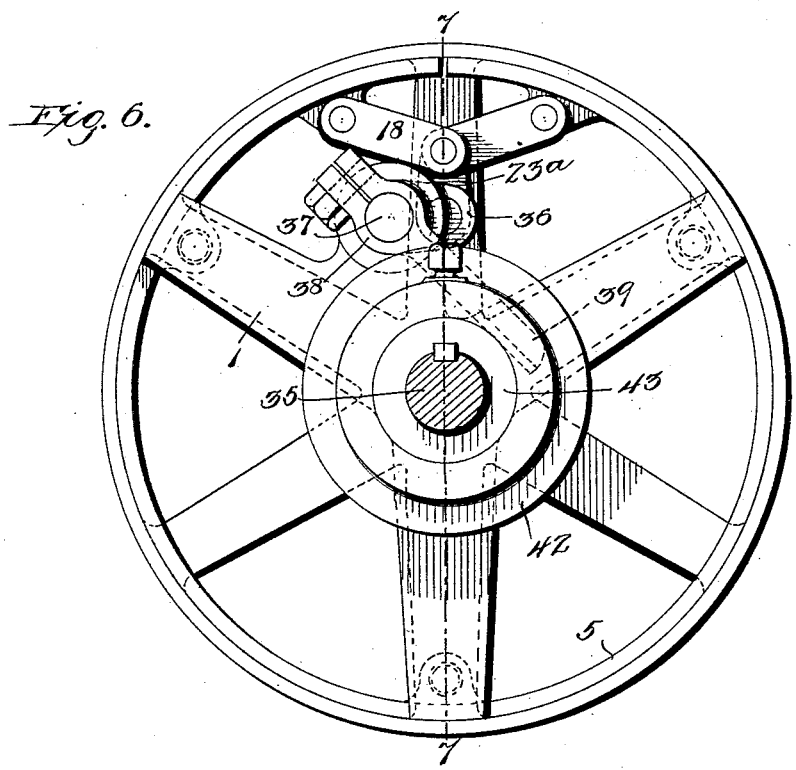
Figure 7:
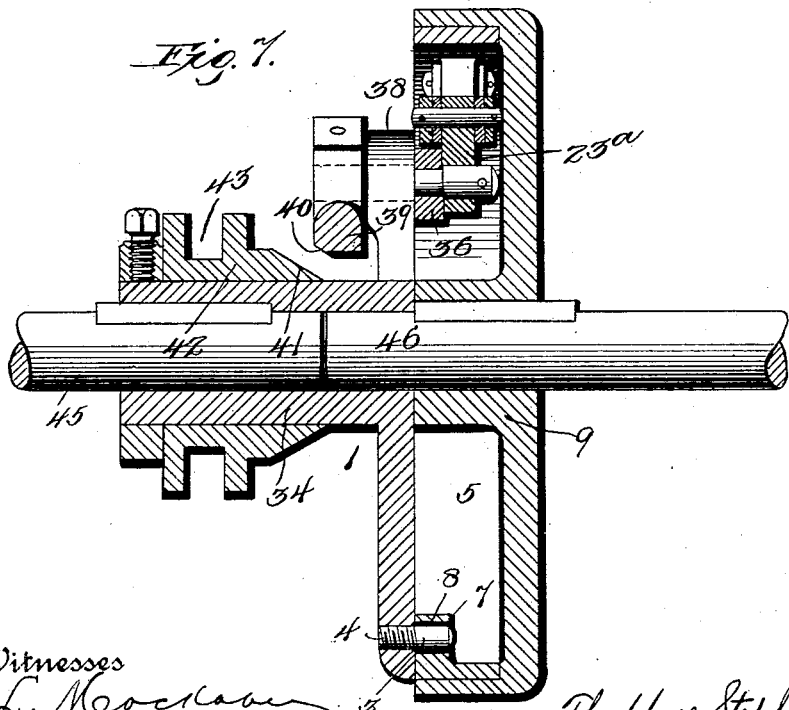

Figure 1 is an elevation of a friction-clutch pulley constructed in accordance with the present invention and illustrating the latter in one of its preferred aspects. Fig. 2 is a sectional view of the construction shown in Fig. 1 on the line 2 2 of the latter figure. Fig. 3 is a detail sectional view showing more plainly the expanding-toggle connection for the split-ring friction-shoe. Fig. 4 is an elevation of a friction-pulley shown in connection with a line-shaft extending therethrough and equipped with the clutch or clutching device contemplated by the present invention. Fig. 5 is a sectional view on the line 5 5 of Fig. 4. Fig. 6 is an elevation of a friction pulley or wheel coöperating with the clutch or clutching device to provide in connection therewith a friction-clutch coupling for shafting. Fig. 7 is a sectional view on the line 7 7 of Fig. 6.

Like reference-numerals designate corresponding parts throughout the several figures of the drawings.

In carrying out the invention in all of its forms there is employed what might be properly termed a "clutch-carrier," which constitutes a supporting element or base for the operative parts of the clutching device proper. This clutch-carrier necessarily is modified somewhat to suit different conditions, according as the clutch or clutching device may be associated with a pulley which does or does not receive a line-shaft therethrough or when the device is associated with the necessary elements to provide a friction-clutch coupling, as suggested in Figs. 6 and 7 of the drawings. However, in a preferred form of the invention, which provides a practical and efficient type of friction-clutch pulley, the said clutch-carrier not only constitutes a support for the working elements of the clutch or clutching device, but also provides a bearing-support for the pulley or wheel, besides providing attaching means for being fitted to the balance-wheel, fly-wheel, disk wheel, or shaft of an engine or other machinery. In the preferred form of the invention the said carrier therefore performs a plurality of important and useful functions, and hence reference will first be made to the adaptation of the invention shown in Figs. 1 and 2 of the drawings.

Referring particularly to Figs. 1 and 2 of the drawings, as well as detail Fig. 3, the numeral 1 designates the clutch-carrier. As shown, this carrier is preferably in the form of a spider, the same being formed with a plurality of radially-extending supporting-arms 2, carrying at or near the outer terminals thereof the laterally-projecting holding pins or studs 3, which may be securely fastened, as at 4, in or to the supporting-arms 2 through the medium of a threaded or equivalent fastening connection. The laterally-projecting terminal holding pins or studs 3 provide a loose support at spaced intervals for the friction-shoe 5. The friction-shoe 5 is preferably in the form of a split ring continuous and unbroken throughout, except at the spring gap or split 6, and at regularly-spaced intervals, corresponding to the intervals between the supporting-arms 2 of the spider clutch-carrier 1, the split-ring friction-shoe 5 is provided with inwardly-projecting hanger-ears 7, provided with openings or perforations 8 therein, which loosely receive or take over the holding pins or studs 3, carried by the carrier. This construction provides a loose hanger support or mounting of the friction-shoe upon the carrier at one side of the latter, which serves to properly position the shoe in operative relation with reference to the pulley or wheel 9, while at the same time permitting the friction-shoe to be expanded evenly and uniformly throughout its entire area, so as to exert a uniform clutching or gripping action upon the surface of the clutch-flange 10 of the pulley or wheel 9.

In the preferred construction (shown in Figs. 1 and 2 of the drawings) the clutch-carrier 1 is not only provided with the supporting-arms 2 for loosely hanging the friction-shoe in the manner described, but is also formed with a plurality of laterally-offset attaching-arms 11, having terminal perforated bolt-ears 12, which afford means for fastening the carrier to the balance-wheel, fly-wheel, or disk wheel of an engine or equivalent machine. Also the said carrier provides a bearing-support for the pulley or wheel 9, and to secure this result is formed with a single integral tubular journal 13, which revolubly receives thereon the sleeve-hub 14 of the friction pulley or wheel 9.

The friction pulley or wheel 9 is of any suitable construction, and the clutch-flange 10 may be a separate or integral part thereof, although in the usual construction the said clutch-flange or clutching-surface 10 is provided by the inner side of the rim of the pulley. The said pulley or wheel 9 is held in position upon the journal 13 of the clutch-carrier through the medium of a flanged nut 15, overlapping the contiguous outer ends of the journal and the pulley-hub and provided with a threaded collar 16, engaging threads formed in the outer end portion of the tubular journal 13. In the construction being referred to the flange-nut 15 is further provided with a guide-opening 17, piercing the same for a purpose to be presently explained.

One of the important features of the present invention resides in the means which are utilized for uniformly expanding the split-ring friction-shoe against the inner side of the pulley-rim or clutch-flange 10. This is preferably and advantageously accomplished through the medium of a shoe-expanding toggle 18. This toggle is arranged inside of the shoe and spans the spring gap or split 6 between the contiguous ends of the shoe and in its preferable construction essentially consists of the oppositely-arranged toggle-links 19, united at their adjacent ends by a knuckle-joint 20 and pivotally connected at their ends opposite the knuckle-joint by means of the pivot-joints 21 to the attaching-ears 22, formed integrally with and projected inwardly from the friction-shoe, respectively at opposite sides of the spring-gap thereof.

Various expedients may be resorted to for spreading the toggle and expanding the shoe against the clutch flange or rim of the pulley. In all of the forms of the invention this is accomplished by means of what might be properly termed a "toggle-spreader." In the construction shown in Figs. 1 and 2 of the drawings the toggle-spreader consists of a sectional adjustable stem 23. The said stem 23, as shown, comprises separate sections 24 and 25, the contiguous portions of which are threaded and are adjustably connected by the sleeve-coupling nut 26, with which coöperates the jam or lock nuts 27, mounted, respectively, at opposite sides of the coupling-nut upon the separate stem-sections 24 and 25. The adjustable sectional stem provides means for regulating or adjusting the tension or pressure which is to be placed upon the shoe-expanding toggle 18, and the innermost stem-section 25 is formed with a bearing-yoke 28, in which is journaled a contact-roller 29, adapted to be engaged by the cam-head 30 of the clutch-actuator 31. As shown in Figs. 1 and 2 of the drawings, the clutch-actuator is preferably in the form of a plunger mounted to slide through the guide-opening 17 of the nut 15 and carrying at its inner end the head 30, having an inclined nose 32, which rides beneath and against the roller 29. At its outer end, exterior to the pulley or wheel 9, the clutch-actuator 31 has mounted thereon a hand-wheel or equivalent operating-handle 33, which may be conveniently grasped by the operator for throwing the clutch in and out of action. When the pulley is to be put in action, the actuator or plunger 31 is thrust inwardly, thereby causing the roller 29 of the toggle-spreader 23 to ride upon the straight portion of the cam-head 30, which necessarily effects an outward movement of the spreader or adjusting-stem 23, with the consequent spreading of the toggle 18. This action expands the friction-shoe against the rim or flange of the pulley, and on account of the loose mounting or hanging of the friction-shoe an equal bearing is provided for the shoe throughout the perimeter of the pulley. Upon drawing the actuator or plunger outward the shoe automatically retracts or contracts away from the pulley or wheel, thus freeing the same, so that it will remain perfectly loose upon the journal 13.

The essential features of the clutch or clutching device proper, as just described, remain the same in all modifications of the invention, it usually only being necessary to slightly modify the carrier and the actuating means of the toggle, according to the particular use of the invention.

In the modification shown in Figs. 4 and 5 of the drawings the spider clutch-carrier 1 is provided with the same supporting means as already described for the friction-shoe; but instead of having a journal for the pulley or wheel the said carrier is provided with an attaching element 34 in the form of a sleeve keyed upon the line-shaft 35, which extends through the hub of the pulley or wheel. The said attaching element 34, therefore, corresponds to the attaching-arms 11 in the construction previously described, thereby adapting the clutch to a type of pulley in which a line-shaft extends through the same. In the said construction—namely, that shown in Figs. 4 and 5 of the drawings—the toggle-spreader is in the form of a link 23ª, connected at one end to the knuckle-joint of the toggle 18 and at its other end to one end of a short rock-arm 36, carried upon the inner end of a short rock-shaft or pin 37, journaled in a shaft-bearing 38, carried by the carrier 1 and having mounted on its outer end an adjusting-lever 39. The free end of the adjusting-lever 39 is preferably beveled, as at 40, for engagement by the correspondingly beveled or tapered nose 41 of the actuating-collar 42, slidably mounted upon the sleeve 34 of the carrier and having an annular groove 43 for the reception of a suitable yoke-lever for moving the collar toward and from the lever 39.

A movement of the tapered collar 42 against and under the lever 39 necessarily effects a spreading of the shoe-expanding toggle, while a movement of the said collar away from the lever 39 permits the friction-shoe to retract or contract away from the pulley or wheel.

In the construction shown in Figs. 6 and 7 of the drawings all the essential parts of the invention are exactly the same as shown and described in connection with Figs. 4 and 5, the only difference residing in the fact that the improvement is shown applied for use in connection with separate shaft-sections 45 and 46, to which are respectively keyed the carrier 1 and the pulley or wheel 9, thus providing an efficient type of friction-clutch coupling.

Other modifications will suggest themselves to those skilled in the art, and it will be understood that various changes in the form, proportion, and minor details of construction may be made within the scope of the invention without departing from the spirit or sacrificing any of the advantages thereof.

Having thus described my invention, what I claim, and desire to secure by Letters Patent, is—

1. In a friction-clutch of the class described, the combination with the pulley or wheel, of a spider clutch-carrier having a plurality of supporting-arms, each having at its inner side an offset supporting element projected laterally toward the pulley or wheel, a split-ring friction-shoe loosely interlocked with each of said supporting elements, and means for expanding the shoe.

2. In a friction-clutch of the class described, the combination with the pulley, of a spider clutch-carrier having offset attaching means, and also having a plurality of supporting-arms, each of said supporting-arms being provided at its inner side and terminal with an offset holding-stud projecting laterally toward the pulley, a split-ring friction-shoe provided with a series of perforated hanger-ears loosely interlocked with said studs, and means for expanding the shoe.

3. In a friction-clutch of the class described, the combination with the pulley, of a spider-carrier having offset attaching means, a plurality of supporting-arms each carrying at its inner side a laterally-projecting holding-stud, and a tubular journal for the pulley, a split-ring friction-shoe having perforated members loosely interlocked with said holding-studs, and actuating means for the shoe including an element working inside of and housed by the tubular journal.

4. In a friction-clutch of the class described, the combination with the pulley, of a carrier having a tubular journal for the pulley, a guiding element fitted to and closing one end of the tubular journal, a split-ring friction-shoe coöperating with the pulley and loosely hung upon the carrier, a shoe-expanding toggle spanning the split of the shoe and connected with opposite portions thereof, a sectional adjustable stem connected with the knuckle of the toggle and carrying at one end a contact-roller, and a manually-operated clutch-operating plunger slidably supported by said guiding element and working within the tubular journal, said plunger carrying at one end inside of the journal a cam-head operating against the contact-roller.

In testimony whereof I affix my signature in presence of two witnesses.

THADDEUS STEPHENS CASNER.

Witnesses:
EDW. A. KRYUT,
A. C. ROBBINS.